INVENTOR
Wallace F. Dunn
BY Edward H. Goodrich
HIS ATTORNEY

United States Patent Office 2,923,582
Patented Feb. 2, 1960

2,923,582

SEPARATOR

Wallace F. Dunn, Bristol, Conn., assignor to General Motors Corporation, Detroit, Mich., a corporation of Delaware Application February 8, 1957, Serial No. 639,044

11 Claims. (Cl. 308—235)

The present invention relates to separators or retainers for guiding the rolling elements of antifriction bearings. More particularly, the present device pertains to a bearing separator for guiding rolling elements which are subjected to relatively non-uniform movements to accommodate unevenly distributed loads and to adjust for possible misalignment of bearing race rings which receive the rolling elements.

The usual antifriction bearing, such as a ball bearing, includes a pair of relatively rotatable coaxial race rings having opposed annular raceways that receive rolling elements as balls. To uniformly distribute the load between these race rings and to prevent the rolling elements from striking against each other, the balls are individually and loosely received in circumferentially spaced pockets in an annular separator or ball retainer between the race rings. These separators are commonly made from metal or other rigid material which locates the balls in a fixed circumferentially spaced relation to each other. Frequently, in certain antifriction bearings and particularly in thrust bearings, one of the race rings becomes located out of coaxial relation with the other ring or becomes subjected to a non-uniformly distributed load. This misalignment or unevenly distributed load would normally cause the rolling elements to individually accelerate with respect to adjacent rolling elements upon entering the load-carrying zone of the bearing and to decelerate when leaving this load-carrying zone. This non-uniform rolling element movement has been prevented by a rigid separator construction which results in a sliding of the rolling elements with consequent detrimental wear to the raceways and separator as well as seriously impairing the antifrictional character of the bearing. In some instances, this non-uniform rolling element movement has been sufficient to break the separator resulting in bearing failure.

It is, therefore, an object of this invention to provide an improved antifriction bearing separator having yieldable roller-element guiding portions to accommodate non-uniform movements of rolling elements.

It is a further object to provide an improved molded separator of yieldable material for positioning the balls in a ball bearing and which has a low coefficient of friction and yieldably guides the balls during the bearing operation.

It is a further object to provide an improved separator of simple construction for holding a plurality of rolling elements in desired circumferentially spaced relation and which may be easily formed by a pair of molded members snapped into interfitting assembled relation.

To these ends and also to improve generally upon devices of this character, the invention consists in the various matters hereinafter described and claimed. In its broader aspects, the invention is not necessarily limited to the specific structures selected for illustrative purposes in the accompanying drawings wherein—

Figures 1, 2:
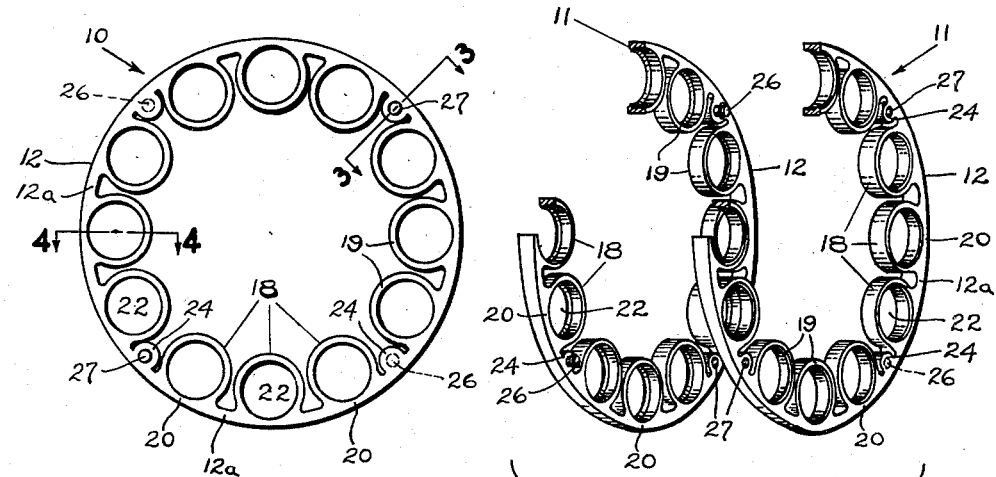
Figure 1 is a side elevation of a preferred form of my invention.
Figure 2 is a fragmentary perspective view showing the two parts of my separator for assembly with each other.
Figure 3:
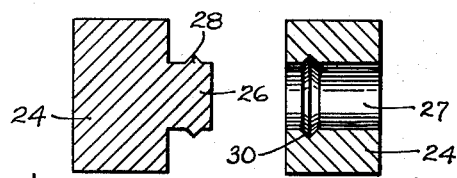
Figure 3 is an enlarged cross section taken along the line 3—3 of Figure 1 and showing my separator fastening means.

Referring to the drawings, my separator, generally indicated at 10, includes a pair of similar yieldable members 11 each of which has an annular rim 12 from which radially projects a series of circumferentially spaced rolling-element receiving portions that respectively and yieldably receive rolling elements as balls 16 for free rotation therein. In my preferred embodiment, the separator members 11 correspond in construction and have interfitting portions such as posts and sockets to secure the two separator halves 11 together as an integrated unit. In view of the corresponding construction of these separator halves, only one of them will be described in detail.

The separator members 11 are preferably molded from a suitable yieldable and generally resilient plastic which will not be detrimentally affected by heat, light, or bearing lubricants and which have a very low coefficient of friction when engaging rolling elements such as the steel balls of a ball bearing. Examples of plastics which I have found well suited to this purpose may comprise a synthetic polymeric amide, often referred to as "nylon," or a polymeric tetrafluoroethylene commonly known as "Teflon."

As illustrated in Figure 1, the rolling element-receiving portions are in the general form of circumferentially spaced yieldable annular loops 18 having narrow resiliently yieldable annular walls 19. A short outer portion 20 of each loop is formed during the molding operation as an integral part of the rim 12. The rim has flexible resilient arcuate portions 12a between each pair of adjacent loops 18 and which are normally in spaced relation to each other as illustrated. In the illustrated embodiments, the loops 18 are directed generally radially inwardly from the rim 12, but it will be appreciated that the rim might comprise an inner ring from which similar spaced loops extend radially outwardly. Each loop 18 has a generally circular rolling element-receiving pocket 22 for loosely receiving and guiding a rolling element such as one of the balls 16. These pockets 22 have their centers or axes preferably located on the pitch circle of the rolling element centers during normal bearing operation.

To fasten the separator halves 11 together as a rolling element-guiding unit, each rim 12 has a plurality of radially inwardly projecting and correspondingly located lugs 24 that are respectively located between a pair of the spaced adjacent loops 18. Studs 26 laterally projecting from certain of the lugs 24 matingly interfit within bores 27 in correspondingly located opposed lugs 24 on the other separator half. Each stud intermediate its length is provided with a peripherally extending enlarged portion 28 which is demountably received within an annular recess 30 intermediate between the ends of the corresponding bore 27. Due to the inherent resiliency of the material of the molded separator halves 11, the bores 27 will yieldably expand under pressure sufficiently to allow the enlarged portions 28 of the studs 26 to snap into interlocking positions within the recesses 30 thus securing the separator halves together as an integral unit. The studs 26 may be formed separately and permanently secured to one of the separator halves, but it is preferable that these studs be molded as an integral part of the separator halves as indicated on the drawings.

Figures 4, 5:
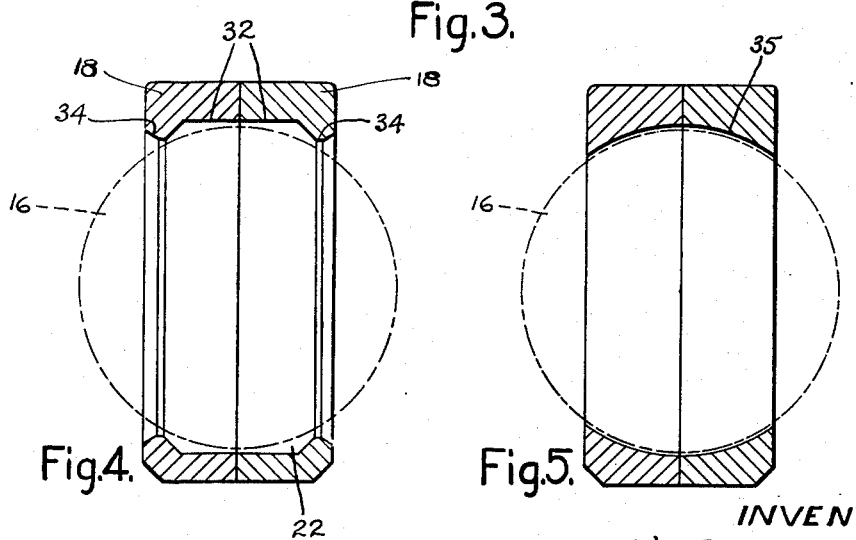
Figure 4 is a sectional view taken along the line 4—4 of Figure 1.
Figure 5 is a cross sectional view showing a modified form of ball pocket.

As shown in Figure 4, each ball receiving pocket 22 may comprise a cylindrical bore 32 terminating at its outer end in a radially inwardly extending annular flange 34. The bores 32 which are coextensive when the separator halves are assembled, have a diameter slightly in excess of that of the diameter of the balls 16 and the flanges 34 are of such lesser diameter as to loosely retain the balls within the pockets without binding engagement against the balls. Preferably, these flanges 34 have such an inner diameter that the separator halves may be initially assembled together and the balls thereafter snapped past the flanges into the pockets 22 in view of the resiliently yieldable characteristics of the molded material of the separator halves. It will be appreciated, of course, that if desired this separator need not be made of two interfitting halves but may be made of a single molded unit. However, in the interests of accuracy and desirable manufacturing procedures, it is preferable that this separator be made in two halves as shown.

As shown in Figure 5, the ball pockets may each be provided with matingly aligned parti-spherical contours 35 of a diameter slightly in excess of the ball diameter. In this modification, the fit of the ball within the parti-spherical pocket may be sufficiently loose so that the ball may be snapped into and out of the pockets or, if it is desired to have a closer fit, the balls may be located in the pockets of one of the separator halves after which the other molded separator member may be snapped into interfitting position.

It will be appreciated that my separator may be easily and accurately formed by a molding operation. Due to the moderately resilient character of its material, the yieldable nature of the rim 12 particularly in the rim portions 12a allows the spaced loops 18 to individually yield towards or away from each other to compensate for any non-uniform rolling element movements thus avoiding the previous tendency of rolling elements to occasionally slide on the raceways. Since the rolling elements are not restrained in their non-uniform movements, the antifrictional character as well as the life of the bearing is greatly improved.

I claim:

1. A separator for guiding the rolling elements of an antifriction bearing comprising a yieldable continuous annular rim, a plurality of circumferentially spaced looped portions projecting generally radially from the rim and located in the plane of the rim, each looped portion being resiliently yieldable and having a radial portion integral with said rim, and each looped portion having a circular pocket coaxial of the rim for loosely and diametrically holding a rolling element in circumferential surrounding relation to said element.

2. A separator for guiding the rolling elements of an antifriction bearing comprising a resiliently yieldable continuous annular rim, a plurality of circumferentially spaced resiliently yieldable looped portions projecting inwardly from and integrally secured to said rim, each looped portion lying within the plane of the rim and having a circular pocket coaxial of said rim for receiving a rolling element, and spaced annular flanges on each loop for demountably holding a single rolling element in each of said pockets and in spaced relation to the adjacent looped portions.

3. A separator for guiding the rolling elements of an antifriction bearing comprising an annular rim, a plurality of circumferentially spaced looped portions formed integrally with and extending from said rim in spaced relation to each other, the rim and loop portions being yieldable to allow for movement of a looped portion with respect to an adjacent looped portion, each looped portion having an open ended rolling element-receiving pocket, and flange portions in each pocket for retaining a rolling element in the pocket.

4. A separator for guiding the rolling elements of an antifriction bearing comprising a resiliently yieldable annular rim, a plurality of circumferentially spaced resiliently yieldable looped portions projecting substantially radially from the rim, a short arcuate portion of each loop being integrally formed with said rim, the integral portions of loop and rim being in circumferentially spaced relation to provide a resiliently yieldable rim portion between each pair of looped portions whereby the loops may yieldably move relative to each other, each looped portion having an open ended pocket for loosely receiving a rolling element, and projections on each loop within its pocket for retaining the rolling element in the pocket.

5. A separator for guiding the rolling elements of an antifriction bearing comprising a molded member of resiliently yieldable material having an annular rim, a plurality of circumferentially spaced looped portions projecting radially inwardly from the rim and located in the plane of the rim, each looped portion being integral with the rim through a short arcuate portion of the loop, each looped portion having an open ended pocket for loosely holding a rolling element, and the yieldable loops having inward projections at each end of the pockets to allow for snapping rolling elements into and out of each pocket.

6. A two part separator for guiding the rolling elements of an antifriction bearing comprising a pair of corresponding annular rims in lateral abutting engagement, interfitting means on said rims for securing them together in coextending unit-handling relation, a correspondingly positioned series of circumferentially spaced looped portions projecting from each rim and in the plane of said rim, the correspondingly located looped portions being in lateral abutting engagement, and each pair of corresponding looped portions cooperatively providing an open ended pocket for loosely receiving and guiding a rolling element.

7. A two part separator for guiding the rolling elements of an antifriction bearing comprising a pair of corresponding resiliently yieldable annular rims in lateral abutting engagement, projections on one rim interfitting with sockets provided on the other rim to secure the rims in coextending unit-handling relation, a circumferentially spaced series of looped portions extending generally radially from each rim and in the plane of its rim, the adjacent looped portions of said series being in coextending abutting relation, and each pair of coextending looped portions cooperatively providing an open ended pocket for loosely receiving and guiding a rolling element.

8. A two part separator for guiding the rolling elements of an antifriction bearing comprising a pair of corresponding resiliently yieldable annular rims in lateral abutting engagement, studs laterally projecting from a side of one of the rims, the other rim having recesses for matingly receiving the studs, correspondingly positioned interlocking means on the studs and recesses to demountably secure the rims together in coextending unit-handling relation, correspondingly positioned series of circumferentially spaced looped portions respectively projecting from each rim and integrally formed therewith, and each pair of laterally adjacent looped portions being in coextending relation and having an open ended pocket for receiving and guiding a rolling element.

9. A bearing separator as defined in claim 8 wherein each stud has an intermediate peripherally extending enlarged portion and each recess is provided intermediate its ends with an annular enlargement for matingly receiving the enlarged portion of a corresponding stud.

10. A two part separator for guiding the balls of a ball bearing comprising a pair of corresponding molded members of resiliently yieldable material and having annular rims in end-abutting engagement, means on the rims securing them in coextending unit-handling relation, a series of looped portions in adjacently spaced circumferential relation extending radially from each rim and in the plane of said rim, each looped portion being integral with the rim through a short part of said loop, the looped portions being correspondingly positioned in each series to locate each pair of axially adjacent loops in coextending relation, each pair of coextending looped portions having a common circular pocket for loosely receiving a ball, and yieldable inward projections at the end of each pocket past which a ball may be snapped into a pocket for unit-handling relation with the separator.

11. A two part separator for guiding the balls of a ball bearing comprising a pair of corresponding molded resiliently yieldable members having corresponding annular rims demountably fastened in end-abutting coextending relation, a series of looped portions in adjacently spaced circumferential relation and projecting radially inwardly from each rim, the looped portions of each series being correspondingly positioned and in the plane of its rim to locate the pair of adjacent loops from each series in coextending abutting relation, and each loop having a parti-spherical open-ended recess which cooperates with the recess of the abutting loop to loosely receive and guide a ball.

References Cited in the file of this patent

UNITED STATES PATENTS

| | | |
|---|---|---|
| 796,648 | Hirth | Aug. 8, 1905 |
| 1,115,124 | Starin | Oct. 27, 1914 |
| 1,170,916 | Lowy | Feb. 8, 1916 |
| 1,361,177 | Peterson | Dec. 7, 1920 |
| 2,566,421 | Lapointe | Sept. 4, 1951 |

FOREIGN PATENTS

| | | |
|---|---|---|
| 176,370 | Canada | Apr. 10, 1917 |